United States Patent
Sinha et al.

(10) Patent No.: US 11,287,151 B2
(45) Date of Patent: Mar. 29, 2022

(54) METHOD AND APPARATUS FOR THERMALLY PRECONDITIONING A MEETING SPACE

(71) Applicant: Carrier Corporation, Palm Beach Gardens, FL (US)

(72) Inventors: Saurabh Kumar Sinha, Hyderabad (IN); Prakash Jayvant Nitsure, Hyderabad (IN); Ankit Sarin, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 113 days.

(21) Appl. No.: 16/788,908

(22) Filed: Feb. 12, 2020

(65) Prior Publication Data

US 2020/0263890 A1 Aug. 20, 2020

(30) Foreign Application Priority Data

Feb. 15, 2019 (IN) .............................. 201911006016

(51) Int. Cl.
| | |
|---|---|
| *F24F 11/30* | (2018.01) |
| *G06Q 10/06* | (2012.01) |
| *G06Q 10/10* | (2012.01) |
| *G06Q 10/02* | (2012.01) |
| *G05B 13/02* | (2006.01) |

(Continued)

(52) U.S. Cl.
CPC .............. *F24F 11/30* (2018.01); *F24F 11/64* (2018.01); *F24F 11/65* (2018.01); *G05B 13/0265* (2013.01); *G06Q 10/02* (2013.01); *G06Q 10/06312* (2013.01); *G06Q 10/109* (2013.01);
(Continued)

(58) Field of Classification Search
CPC .. F24F 11/30; F24F 11/64; F24F 11/65; F24F 2120/12; F24F 2120/20; G05B 13/0265; G06Q 10/02; G06Q 10/06312; G06Q 10/109; G06Q 50/163
See application file for complete search history.

(56) References Cited

U.S. PATENT DOCUMENTS 6,754,504 B1 * 6/2004 Reed ...................... G06Q 50/00
455/414.1
9,514,411 B2 12/2016 Chen et al.
(Continued)

FOREIGN PATENT DOCUMENTS

| AU | 2008207842 A1 | 7/2008 |
|---|---|---|
| AU | 2016202784 A1 | 5/2016 |

(Continued)

*Primary Examiner* — Chun Cao
(74) *Attorney, Agent, or Firm* — Carlson, Gaskey & Olds, P.C.

(57) ABSTRACT

An example method for thermally preconditioning a meeting space includes determining that a meeting is electronically scheduled for a meeting space for a plurality of attendees. A thermal preconditioning setpoint for the meeting space is determined based on individual thermal preferences of the plurality of attendees, and a historical setpoint of the meeting space. A time required to achieve the thermal preconditioning setpoint is determined based on the thermal preconditioning setpoint and a temperature of the meeting space before the scheduled meeting. Thermal preconditioning of the meeting space is initiated based on the determined thermal preconditioning setpoint and the determined time.

23 Claims, 2 Drawing Sheets

(51) Int. Cl.
*F24F 11/64* (2018.01)
*F24F 11/65* (2018.01)
*G06Q 50/16* (2012.01)
*F24F 120/20* (2018.01)
*F24F 120/12* (2018.01)

(52) U.S. Cl.
CPC ........ *G06Q 50/163* (2013.01); *F24F 2120/12* (2018.01); *F24F 2120/20* (2018.01)

(56) References Cited

U.S. PATENT DOCUMENTS

| | | | |
|---|---|---|---|
| 9,817,383 | B1 | 11/2017 | Sinha et al. |
| 9,920,945 | B2 | 3/2018 | Sato et al. |
| 2015/0134585 | A1* | 5/2015 | Chen ................... G05B 15/02 706/48 |
| 2015/0363728 | A1* | 12/2015 | Patel ................ G06Q 10/06314 705/7.23 |
| 2016/0061469 | A1* | 3/2016 | Albonesi .................. H02J 3/14 700/276 |
| 2016/0223218 | A1 | 8/2016 | Barrett |
| 2016/0363943 | A1* | 12/2016 | Stefanski ................. F24F 11/62 |
| 2018/0373234 | A1 | 12/2018 | Khalate et al. |
| 2019/0011894 | A1 | 1/2019 | Meyer et al. |
| 2019/0158309 | A1* | 5/2019 | Park .................... H04L 12/2827 |
| 2019/0353376 | A1* | 11/2019 | Rigg .................... G05B 13/021 |
| 2020/0186382 | A1* | 6/2020 | Harel .................... H04L 51/063 |

FOREIGN PATENT DOCUMENTS

| | | |
|---|---|---|
| AU | 2015203702 A1 | 1/2017 |
| AU | 2016293819 A1 | 1/2018 |
| CA | 2525199 A1 | 5/2007 |
| CA | 2748984 A1 | 7/2010 |
| CN | 1959724 A | 5/2007 |
| CN | 101782259 A | 7/2010 |
| CN | 105190193 A | 12/2015 |
| CN | 107655145 A | 2/2018 |
| WO | 2010022274 A1 | 2/2010 |
| WO | 2017015664 A1 | 1/2017 |
| WO | 2018200740 A2 | 11/2018 |

* cited by examiner

METHOD AND APPARATUS FOR THERMALLY PRECONDITIONING A MEETING SPACE

CROSS-REFERENCE TO RELATED APPLICATIONS

This application claims the benefit of Indian Provisional Application No. 201911006016, filed on Feb. 15, 2019, which is incorporated by reference herein in its entirety.

BACKGROUND

This application relates to thermal conditioning, and more particularly to thermally preconditioning a meeting space.

Electronic scheduling systems enable workers to coordinate their schedules with each other, and often indicate the particular rooms in which scheduled meetings will occur. However, attendees may have differing thermal conditioning preferences, leading to attendee discomfort during at least the initial portion of meetings.

SUMMARY

A method for thermally preconditioning a meeting space according to an example of the present disclosure includes determining that a meeting is electronically scheduled for a meeting space for a plurality of attendees. A thermal preconditioning setpoint for the meeting space is determined based on individual thermal preferences of the plurality of attendees and a historical setpoint of the meeting space. A time required to achieve the thermal preconditioning setpoint is determined based on the thermal preconditioning setpoint and a temperature of the meeting space before the scheduled meeting. Thermal thermal preconditioning of the meeting space is initiated based on the determined thermal preconditioning setpoint and the determined time.

In a further embodiment of any of the foregoing embodiments, determining that a meeting is electronically scheduled for the meeting space includes detecting that the meeting is electronically scheduled in a meeting reservation system.

In a further embodiment of any of the foregoing embodiments, detecting that the meeting is electronically scheduled in the meeting reservation system includes communicating with a database of the meeting reservation system.

In a further embodiment of any of the foregoing embodiments, the method includes detecting a quantity of attendees present in the meeting space during the electronically scheduled meeting, adjusting the thermal preconditioning setpoint based on the detected quantity of attendees, and utilizing the adjusted thermal preconditioning setpoint for thermal conditioning of the meeting space during the meeting.

In a further embodiment of any of the foregoing embodiments, the historical setpoint is an analytics-based setpoint for the meeting space that is based on a time of day of the scheduled meeting.

In a further embodiment of any of the foregoing embodiments, the historical setpoint is an analytics-based setpoint for the meeting space that is based on outside air temperatures during previous meetings in the meeting space.

In a further embodiment of any of the foregoing embodiments, the historical setpoint is an analytics-based setpoint for the meeting space that is based on historical overrides of thermal conditioning setpoints of the meeting space during previous meetings.

In a further embodiment of any of the foregoing embodiments, determining a time required to achieve the thermal preconditioning setpoint is further based on a volume of the meeting space.

In a further embodiment of any of the foregoing embodiments, a volume of the meeting space is adjustable between two sizes through movement of partition wall, and the determining of a time required to achieve the thermal preconditioning setpoint is based on a larger of the two sizes.

In a further embodiment of any of the foregoing embodiments, determining a time required to achieve the thermal preconditioning setpoint is further based on at least one of a number of thermal conditioning vents in the meeting space, and a fan speed of a supply fan in fluid communication the meeting space.

In a further embodiment of any of the foregoing embodiments, the individual thermal preferences of the attendees include a personal thermal setpoint for each attendee, and determining a thermal preconditioning setpoint for the meeting space based on individual thermal preferences of the attendees includes determining a median of the personal temperature setpoints.

A thermal controller according to an example of the present disclosure includes a processor operative connected to memory. The processor is configured to determine that a meeting is electronically scheduled for a meeting space for a plurality of attendees and to determine a thermal preconditioning setpoint for the meeting space based on individual thermal preferences of the plurality of attendees, and a historical setpoint of the meeting space stored in the memory. The processor is also configured to determine a time required to achieve the thermal preconditioning setpoint based on the thermal preconditioning setpoint and a temperature of the meeting space before the scheduled meeting, and to initiate thermal preconditioning of the meeting space based on the determined thermal preconditioning setpoint and the determined time.

In a further embodiment of any of the foregoing embodiments, the communication is received from a meeting reservation system.

In a further embodiment of any of the foregoing embodiments, the processor is configured to detect a quantity of attendees present in the meeting space during the meeting, adjust the thermal preconditioning setpoint based on the detected quantity of attendees and utilize the adjusted thermal preconditioning setpoint for thermal conditioning of the meeting space during the meeting.

In a further embodiment of any of the foregoing embodiments, the historical setpoint is an analytics-based setpoint for the meeting space that is based on a time of day of the scheduled meeting.

In a further embodiment of any of the foregoing embodiments, the historical setpoint is an analytics-based setpoint for the meeting space that is based on outside air temperatures during previous meetings in the meeting space.

In a further embodiment of any of the foregoing embodiments, the historical setpoint is an analytics-based setpoint for the meeting space that is based on historical overrides of thermal setpoints of the meeting space during previous meetings.

In a further embodiment of any of the foregoing embodiments, the processor is configured to further base the determination of a time required to achieve the thermal preconditioning setpoint on a volume of the meeting space.

In a further embodiment of any of the foregoing embodiments, the individual thermal preferences of the attendees include a personal thermal setpoint for each attendee, and the processor is configured to determine a median of the personal temperature setpoints, and utilize the median in determining the thermal preconditioning setpoint for the meeting space.

In a further embodiment of any of the foregoing embodiments, the processor is configured to further base the determination of a time required to achieve the thermal preconditioning setpoint on a number of thermal conditioning vents in the meeting space, and a fan speed of a supply fan in fluid communication the meeting space.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
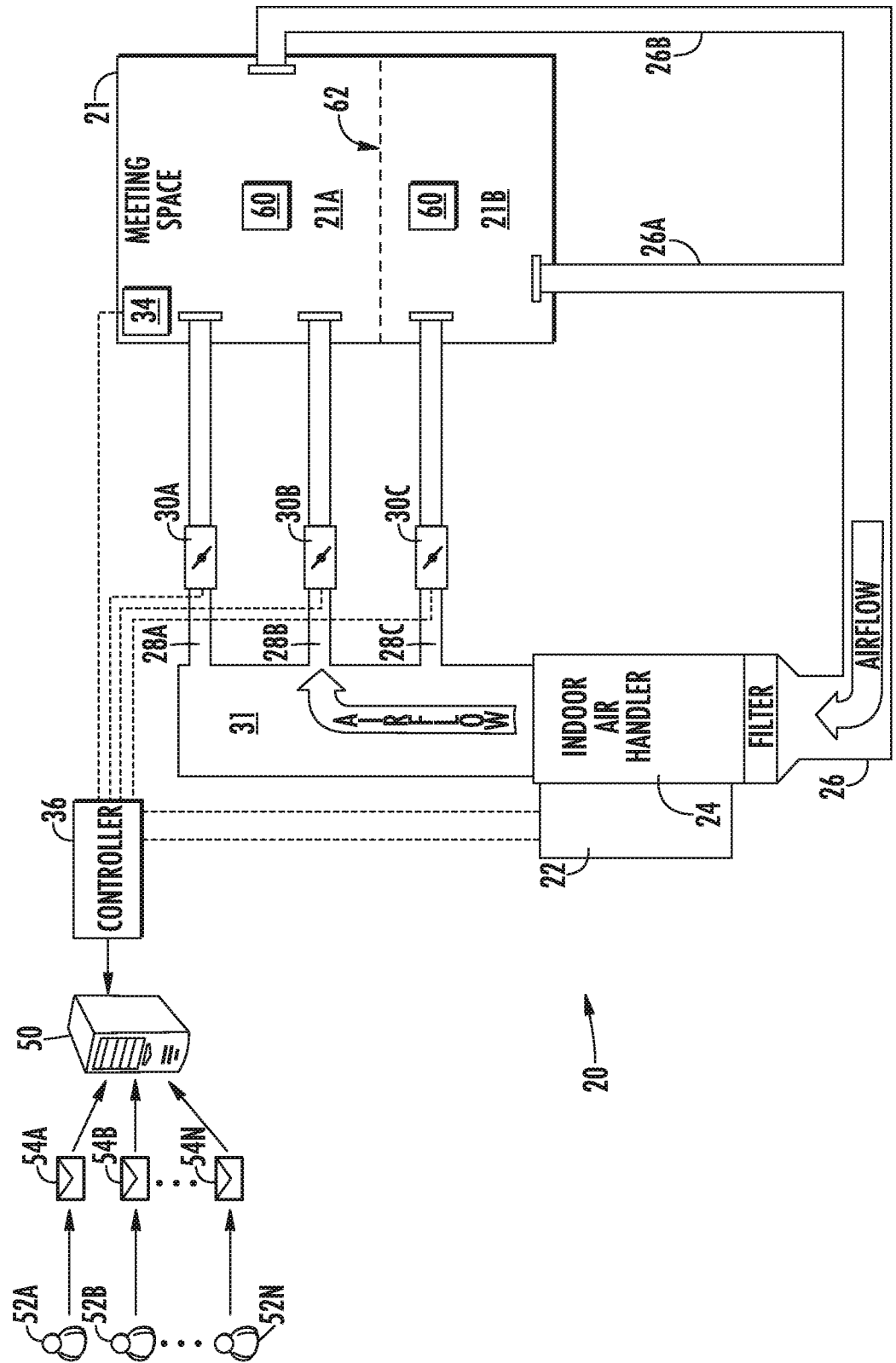
FIG. 1 is a schematic view of an HVAC system.

FIG. 1 schematically illustrates an example HVAC system 20 that provides thermal conditioning for a meeting space 21 and other parts of a building (not shown). A temperature changing component 22 for changing the condition of air, e.g., an indoor unit (furnace/heater coil) and/or an outdoor unit (air conditioning/heat pump), is associated with an indoor air handler 24. The meeting space 21 could include a conference room or auditorium, for example. The air handler 24 takes air from return ducts 26A-B and drives the air into a plenum 31, and a plurality of supply ducts 28A-C each associated with the meeting space 21. As shown, a respective damper 30A-C is provided on each of the supply ducts 28A-C.

A controller 36 controls the dampers 30A-C, temperature changing component 22, and indoor air handler 24, and also communicates with a thermostat 34 associated with the meeting space 21. The thermostat 34 allows meeting attendees to adjust a temperature setpoint for the meeting space 21, and includes one or more temperature sensors for providing an actual temperature feedback to the controller 36.

A server 50 hosts and/or provides access to meeting scheduling software for scheduling meetings in various meeting spaces, including the meeting space 21. Users 52A-N interact with the server to scheduling meetings. This may include transmitting responses 54A-N to meeting invitations with an answer of "Attending," "Not Attending," or "Tentative." Such responses can be transmitted through an email client, for example (e.g., MICROSOFT OUTLOOK). Also, the server stores or has access to a personal profile of each user 52 that includes a preferred thermal setpoint for the user 52.

By interacting with the server 50 (e.g., querying the meeting scheduling software and/or its underlying database of meeting events), the controller 36 is able to determine that a meeting is electronically scheduled for the meeting space 21 (including its start and end time), determine which users 50 will be attending the meeting, and determine a thermal preconditioning setpoint SPC for the meeting space 21 based on individual thermal preferences of the plurality of attendees and a historical setpoint of the meeting space 21. The controller 36 is also able to determine a time required to achieve the thermal preconditioning setpoint SPC based on the thermal preconditioning setpoint and a temperature of the meeting space before the scheduled meeting. Having determined the thermal preconditioning setpoint SPC and time required to achieve the thermal preconditioning setpoint, the controller 36 is able to control the temperature changing component 22 to initiate thermal preconditioning of the meeting space 21 based on the determined thermal preconditioning setpoint SPC and the determined time. For example, if 10 minutes is required to achieve the thermal preconditioning setpoint, the controller 36 is configured to initiate thermal preconditioning at least 10 minutes before the start time of the meeting.

Below is an example equation that can be used to determine the thermal preconditioning setpoint SPC.

$$S_{PC}=0.8*(k*S_{PP}+j*S_{HA}+m*S_{RT})/(k+j+m) \qquad \text{eq. (1)}$$

where: k, j, and m are weights;
$S_{PP}$ is a combined personal temperature preference setpoint of the attendees;
$S_{HA}$ is a historical analytics-based setpoint for the meeting space 21; and
$S_{RT}$ is a real-time setpoint for the meeting space 21 during a scheduled meeting.

In one example, the combined personal temperature preference setpoint $S_{PP}$ is a median of the respective individual personal preference setpoint of each attendee. Of course, it is understood that this is a non-limiting example and that other combined setpoints could be used, such as a mean or average of the personal preference setpoints of the attendees.

In one example, the personal preference temperature setpoint $S_{PP}$ is based on any attendee who responds with "Attending" or its equivalent to a meeting request to indicate that they will attend a meeting. In a further example, the personal preference temperature setpoint $S_{PP}$ is also based on any attendee who responds with "Tentative" or its equivalent to a meeting request to indicate that they may attend the meeting.

The historical analytics-based setpoint $S_{HA}$ is determined for the meeting space 21 based on historical data and can be based on any combination of the following:
    a volume of the meeting space 21;
    an outside air temperature during meetings previously held in the meeting space 21;
    a time of day during meetings previously held in the meeting space 21;
    a quantity of attendees of meetings previously held in the meeting space 21;
    historical thermostat adjustments (e.g., overrides) during meetings previously held in the meeting space 21;
    an outside air temperature during meetings previously held in the meeting space 21; and
    a geographic region in which the meeting space 21 is located.

In this regard, the historical analytics-based setpoint $S_{HA}$ is a multi-dimensional value that takes into consideration a plurality of the items listed above. In one example, a regression analysis can be performed as part of determining the historical analytics-based setpoint $S_{HA}$. Over the time the historical analytics-based setpoint $S_{HA}$ will improve setpoint determination. After a substantial amount of historical data $S_{HA}$ will be closer to an ideal setpoint value for thermal pre-conditioning. The various inputs can be analyzed using regression or another high-order prediction algorithm.

Regarding the quantity of attendees of meetings previously held in the meeting space 21, consider an example in which the other parameters are constant, or are within a fixed range of values, but the number of attendees varies historically. For example, assume there have been 50 previous meetings in the meeting space 21 that have happened at approximately the same time of the day and with approximately the same outside air temperature (e.g., ±3 degrees), but the number of attendee was different. The historical analytics-based setpoint will tune up with the attendee data, identifying potential correlations between quantity of attendees and a thermal preconditioning setpoint.

Regarding the geographic region, the geographic region/location of a building is highly correlated to environmental data, such as outdoor air temperature ("OAT"). This variable may allow access to historical environment data for that region (e.g., OAT). In addition, in high rise buildings different altitudes may have different outside air temperature trends at same time. For example, at the 15th floor the OAT will likely be different than at 5th floor, and therefore it may be desirable to thermally precondition rooms on those separate floors differently. The use of geographic region and/or OAT (e.g., floor-specific OAT) can further provide for determining an ideal thermal preconditioning setpoint that accommodates such differences.

In one example, the real-time setpoint $S_{RT}$ is a default setpoint for the meeting space 21, and the weight m is set to zero for preconditioning, which zeros out the $S_{RT}$ term during preconditioning, but m is adjusted to have a non-zero value during a scheduled meeting in the meeting space 21. This term can also be useful if there are back-to-back meetings, because towards the end of the first meeting m could be reduced or zeroed out to perform thermal preconditioning for the second meeting and minimize the weight given to attendees of the meeting about to end.

At the end of the scheduled meeting (which can be determined based on the meeting duration specified in the scheduling system and/or based on occupancy detectors), the controller 36 may revert to either no thermal conditioning for the meeting space 21, or to using only the default thermal conditioning setpoint for the meeting space 21.

In one example, the meeting space 21 includes one or more occupancy detectors 60 to detect a quantity of attendees during a scheduled meeting. In one example, if no attendees are present after a predefined portion of the scheduled meeting has transpired (e.g., 5 or 10 minutes), the controller 36 may either cease any thermal conditioning of the meeting space 21, or revert to a thermal conditioning setpoint used prior to preconditioning the meeting space 21 for the scheduled meeting.

Thermal conditioning during the scheduled meeting may be performed based on the occupancy sensors 60 as well. In one example, the controller 36 detects a quantity of attendees present in the meeting space 21 during an electronically scheduled meeting, and adjusts the thermal preconditioning setpoint $S_{PC}$ based on the detected quantity of attendees (e.g., through adjustment of the real-time setpoint $S_{RT}$), and utilizes the adjusted thermal preconditioning setpoint $S_{PC}$ for thermal conditioning of the meeting space 21 during the meeting.

An example equation for determining a time t for thermal conditioning of the meeting space 21 for a scheduled meeting is shown in equation (2) below.

$$t=\beta*(V*\Delta t)/(F_S*\Sigma_{p=1}^{N}A_P*Y) \quad \text{eq. (2)}$$

Where: $\beta$ is a proportionality constant;
V is a volume of the meeting space 21;
$\Delta t$ is a temperature difference between the thermal preconditioning setpoint $S_{PC}$ and a current temperature of the meeting space 21;

$F_s$ is a supply fan speed of a supply fan of the indoor air handler 24;
N represents a quantity of supply ducts 28 for the meeting space 21;
$A_P$ is a cross-sectional area of one or more of the supply ducts 28A-C; and
O is a percentage opening of dampers 30 attached to the $p^{th}$ supply duct 28.

Equation (3) below provides an example way to calculate the proportionality constant $\beta$.

$$\beta=(x\%*\text{Load}_{external})+(100-x)\%*\text{Load}_{internal}) \quad \text{eq. (3)}$$

where x is a configuration parameter that varies from 0-100;
$\text{Load}_{external}$ is a total heat rate exchanged between a building in which the meeting space 21 resides and the environment exterior to the building; and
Load internal is a total (i.e., sensible and latent) heat gained in the building in which the meeting space 21 resides due to occupant activity, humidity source(s), electronic equipment/appliances, and artificial lighting.

In the example of FIG. 1, the meeting space 21 includes a removable partition wall 62 that divides the meeting space 21 into two sections 21A and 21B. Thus, referring to the section 21A, the section has a volume that is adjustable between a first size when the wall 62 is extended, and a second, larger size when the wall 62 is collapsed. In one example, unless specifically instructed about a status of the wall 62 (e.g., extended or collapsed), the controller 36 assumes that the wall 62 is collapsed and that the entire meeting space 21 needs to be thermally preconditioned for a given meeting.

If back-to-back meetings are scheduled in the meeting space 21, the controller 36 can start thermal preconditioning for the second meeting at the end of the first meeting. For example, if the first meeting is scheduled for one hour, and the time needed for thermal preconditioning of the second meeting is 5 minutes, the controller 36 can start thermal preconditioning for the second meeting 55 minutes after the first meeting has started.

Figure 2:
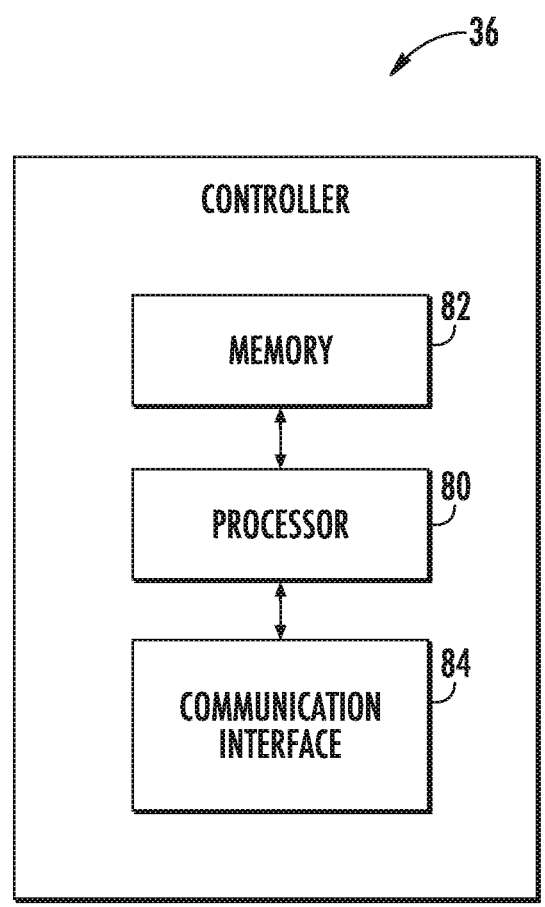
FIG. 2 is a schematic view of a controller for the HVAC system of FIG. 1.

Referring now to FIG. 2, the controller 36 is illustrated in greater detail. The controller includes a processor 80 operatively connected to memory 82 and a communication interface 84. The processor 80 includes processing circuitry to carry out the various steps and calculations described above. The processor 80 may include one or more microprocessors, microcontrollers, application specific integrated circuits (ASICs), or the like, for example.

The memory 82 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 82 may incorporate electronic, magnetic, optical, and/or other types of storage media. The memory 82 can also have a distributed architecture, where various components are situated remotely from one another, but can be accessed by the processor 80 (e.g., the memory 82 may include a database separate from the controller 36).

The communication interface 84 provides for communication between the controller and the server 50 (e.g., over a local or wide-area network).

By performing thermal preconditioning as described above, sudden changes in temperature which can be experienced when entering into an existing meeting space can be avoided, thereby improving the thermal comfort and overall experience for meeting attendees. Also, the system described above provides for useful synchronization between meeting scheduling software and meeting spaces for an improved thermal profile.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method for thermally preconditioning a meeting space, comprising:
    determining that a meeting is electronically scheduled for a meeting space for a plurality of attendees;
    determining a thermal preconditioning setpoint for the meeting space based on individual thermal preferences of the plurality of attendees, and a historical setpoint of the meeting space;
    determining a time required to achieve the thermal preconditioning setpoint based on the thermal preconditioning setpoint and a temperature of the meeting space before the scheduled meeting; and
    utilizing HVAC equipment to initiate thermal preconditioning of the meeting space based on the determined thermal preconditioning setpoint and the determined time.

2. The method of claim 1, wherein said determining that a meeting is electronically scheduled for the meeting space comprises detecting that the meeting is electronically scheduled in a meeting reservation system.

3. The method of claim 2, wherein said detecting that the meeting is electronically scheduled in the meeting reservation system comprises communicating with a database of the meeting reservation system.

4. The method of claim 1, comprising:
    detecting a quantity of attendees present in the meeting space during the electronically scheduled meeting;
    adjusting the thermal preconditioning setpoint based on the detected quantity of attendees; and
    utilizing the HVAC equipment and the adjusted thermal preconditioning setpoint for thermal conditioning of the meeting space during the meeting.

5. The method of claim 1, wherein the historical setpoint is an analytics-based setpoint for the meeting space that is based on a time of day of the scheduled meeting.

6. The method of claim 1, wherein the historical setpoint is an analytics-based setpoint for the meeting space that is based on outside air temperatures during previous meetings in the meeting space.

7. The method of claim 1, wherein the historical setpoint is an analytics-based setpoint for the meeting space that is based on historical overrides of thermal conditioning setpoints of the meeting space during previous meetings.

8. The method of claim 1, wherein said determining a time required to achieve the thermal preconditioning setpoint is further based on a volume of the meeting space.

9. The method of claim 8, wherein the volume of the meeting space is adjustable between two sizes through movement of partition wall, and said determining a time required to achieve the thermal preconditioning setpoint is based on a larger of the two sizes.

10. The method of claim 8, wherein said determining a time required to achieve the thermal preconditioning setpoint is further based on at least one of a number of thermal conditioning vents in the meeting space, and a fan speed of a supply fan in fluid communication the meeting space.

11. The method of claim 1, wherein:
    the individual thermal preferences of the attendees comprise a personal thermal setpoint for each attendee; and
    said determining a thermal preconditioning setpoint for the meeting space based on individual thermal preferences of the attendees comprises determining a median of the personal temperature setpoints.

12. A thermal controller comprising:
    a processor operative connected to memory, the processor configured to:
        determine that a meeting is electronically scheduled for a meeting space for a plurality of attendees;
        determine a thermal preconditioning setpoint for the meeting space based on individual thermal preferences of the plurality of attendees, and a historical setpoint of the meeting space stored in the memory;
        determine a time required to achieve the thermal preconditioning setpoint based on the thermal preconditioning setpoint and a temperature of the meeting space before the scheduled meeting; and
        utilize HVAC equipment to initiate thermal preconditioning of the meeting space based on the determined thermal preconditioning setpoint and the determined time.

13. The thermal controller of claim 12, wherein the communication is received from a meeting reservation system.

14. The thermal controller of claim 13, wherein the processor is configured to:
    detect a quantity of attendees present in the meeting space during the meeting;
    adjust the thermal preconditioning setpoint based on the detected quantity of attendees; and
    utilize the HVAC equipment and the adjusted thermal preconditioning setpoint for thermal conditioning of the meeting space during the meeting.

15. The thermal controller of claim 12, wherein the historical setpoint is an analytics-based setpoint for the meeting space that is based on a time of day of the scheduled meeting.

16. The thermal controller of claim 12, wherein the historical setpoint is an analytics-based setpoint for the meeting space that is based on outside air temperatures during previous meetings in the meeting space.

17. The thermal controller of claim 12, wherein the historical setpoint is an analytics-based setpoint for the meeting space that is based on historical overrides of thermal setpoints of the meeting space during previous meetings.

18. The thermal controller of claim 12, wherein the processor is configured to further base the determination of a time required to achieve the thermal preconditioning setpoint on a volume of the meeting space.

19. The thermal controller of claim 12, wherein:
    the individual thermal preferences of the attendees comprise a personal thermal setpoint for each attendee; and
    the processor is configured to determine a median of the personal temperature setpoints, and utilize the median in determining the thermal preconditioning setpoint for the meeting space.

20. The thermal controller of claim 12, wherein the processor is configured to further base the determination of a time required to achieve the thermal preconditioning setpoint on a number of thermal conditioning vents in the meeting space, and a fan speed of a supply fan in fluid communication the meeting space.

21. The method of claim 1, wherein:

said utilizing HVAC equipment to initiate thermal preconditioning of the meeting space based on the determined thermal preconditioning setpoint and the determined time comprises initiating the thermal preconditioning at a particular time that is before a start time of the meeting, wherein a difference between the start time and the particular time is at least as long as the determined time required to achieve the thermal preconditioning setpoint.

22. The thermal controller of claim 12, wherein to utilize HVAC equipment to initiate thermal preconditioning of the meeting space based on the determined thermal preconditioning setpoint and the determined time, the controller is configured to:

initiate the thermal preconditioning at a particular time that is before a start time of the meeting, wherein a difference between the start time and the particular time is at least as long as the determined time required to achieve the thermal preconditioning setpoint.

23. The thermal controller of claim 18, wherein:

The volume of the meeting space is adjustable between two sizes through movement of partition wall; and the controller is configured to base the determination of the time required to achieve the thermal preconditioning setpoint on a larger of the two sizes.

* * * * *